US008938404B2

(12) United States Patent
Capman et al.

(10) Patent No.: US 8,938,404 B2
(45) Date of Patent: Jan. 20, 2015

(54) SYSTEM AND METHOD FOR DETECTING ABNORMAL AUDIO EVENTS

(75) Inventors: Francois Capman, Colombes (FR); Bertrand Ravera, Colombes (FR)

(73) Assignee: Thales, Neuilly sur Seine (FR)

( * ) Notice: Subject to any disclaimer, the term of this patent is extended or adjusted under 35 U.S.C. 154(b) by 427 days.

(21) Appl. No.: 13/266,101

(22) PCT Filed: Apr. 21, 2010

(86) PCT No.: PCT/EP2010/055266

§ 371 (c)(1), (2), (4) Date: Mar. 16, 2012

(87) PCT Pub. No.: WO2010/122056

PCT Pub. Date: Oct. 28, 2010

(65) Prior Publication Data

US 2012/0185418 A1 Jul. 19, 2012

(30) Foreign Application Priority Data

Apr. 24, 2009 (FR) ..................................... 09 02007

(51) Int. Cl.
*G06N 99/00* (2010.01)

(52) U.S. Cl.
CPC .................................... *G06N 99/005* (2013.01)
USPC ............................................................ 706/12

(58) Field of Classification Search
USPC ............................................................ 706/12
See application file for complete search history.

(56) References Cited

PUBLICATIONS

Events Detection for an Audio-Based Surveillance System C. Clavel 1 2, T. Ehrette 1, G. Richard 2 1Thales Research and Technology France, Domaine de Corbeville, 91404 Orsay Cedex, France 2 GET-ENST, 46 rue Barrault, 75634 Paris Cedex 13, France.*
One-Class SVMs Challenges in Audio Detection and Classification Applications Asma Rabaoui, Hachem Kadri, Zied Lachiri, and Noureddine Ellouze Unite de Recherche Signal, Image et Reconnaissance des Formes, Ecole Nationale d'Ingenieurs de Tunis (ENIT), BP 37, Campus Universitaire, 1002 Tunis, Tunisia.*
Data Clustering: A Review A.K. Jain Michigan State University M.N. Murty Indian Institute of Science and P.J. Flynn the Ohio State University.*
Audio Events Detection in Public Transport Vehicle Jean-Luc Rouas, Jérôme Louradour, Sébastien Ambellou.*
(Continued)

*Primary Examiner* — Kakali Chaki
*Assistant Examiner* — Ababacar Seck
(74) *Attorney, Agent, or Firm* — Baker & Hostetler LLP

(57) ABSTRACT

Techniques for detecting abnormal audio events in a given environment, including learning the modeling of the environment to be surveilled during which a database is created by extraction of acoustic parameters associated with audio streams picked up over a fixed time period and an unsupervized automatic segmentation of said streams, followed by grouping the segments in classes and a statistical modeling of the segment classes, a usage phase including analysis of an audio stream, with the extraction of the acoustic parameters, automatic segmentation of said analyzed stream substantially identical to that used during the learning phase and determining a likelihood of each statistical model contained in the database for each of the segments of the analyzed audio stream, resulting in a likelihood value which is compared to a threshold value to determine the presence or absence of audio anomalies in the analyzed audio stream.

12 Claims, 5 Drawing Sheets

(56) References Cited

PUBLICATIONS

Audio Based Event Detection for Multimedia Surveillance Pradeep K. Atrey\, Namunu C. Maddage and Mohan S. Kankanhalli\ \School of Computing, National University of Singapore Institute for Infocomm Research Republic of Singapore.*

J.-L. Rouas, et al; Audio Events Detection in Public Transport Vehicle; Proceedings of the 2006 IEEE Intelligent Transprotation Systems Conference; Sep. 17, 2006; pp. 733-738; XP002560445.

A. Harma, et al; "Automatic Surveillance of the Acoustic Activity in our Living Environment"; Proceedings of the 2005 IEEE International Conference on Multimedia and Expo; Jul. 6, 2005; pp. 634-637; XP010843267.

C. Clavel, et al; "Events Detection for an Audio-based Surveillance System"; Proceedings of the 2005 IEEE International Conference on Multimedia and Expo; Jul. 6, 2005; XP010843906.

A. K. Jain, et al; "Data Clustering: A Review" ACM Computing Surveys, vol. 31, No. 3; Sep. 3, 1999; pp. 264-323; XP002165131.

* cited by examiner

1) Calculation of the mean vector 2) (nb_class = 1)

3) (nb_class = nb_class + 1) ; nb_class = 5

SYSTEM AND METHOD FOR DETECTING ABNORMAL AUDIO EVENTS

CROSS-REFERENCE TO RELATED APPLICATIONS

This application is a National Stage of International patent application PCT/EP2010/055266, filed on Apr. 21, 2010, which claims priority to foreign French patent application No. FR 09 02007, filed on Apr. 24, 2009, the disclosures of each of which are incorporated by reference in their entireties.

FIELD OF THE DISCLOSE SUBJECT MATTER

The subject of the present invention relates to a system and a method for detecting sound events considered to be abnormal relative to a usual sound environment.

The invention applies notably to area, place or space surveillance applications.

BACKGROUND

In the field of the surveillance and analysis of environments, the conventional systems known from the prior art are mainly based on image and video technologies.

In the field of surveillance using audio, the technical problems involved are notably as follows:

1) how can you detect specific and/or abnormal sound events?

2) how can you have solutions that are robust to the background noise and its variabilities, that is to say solutions that are reliable and that do not generate alarm signals continually or in an untimely manner?

3) how do you classify the various events recorded?

In the field of the analysis of sound events, the prior art distinguishes two processes. The first is a detection process. The second is a detected events classification process.

The conventional detection methods for sound events are generally based on the extraction of parameters characteristic of the signals that are to be detected. The parameters are, usually, time-related, frequency-related or time/frequency-related parameters.

In the case of the classification methods known from the prior art, these are usually based on so-called supervised approaches, in which a model for each event to be classified is obtained from segmented and labeled learning data. These solutions are based, for example, on classification algorithms known by the abbreviations HMM for Hidden Markov Model, GMM for Gaussian Mixture Model, SVM for Support Vector Machine, or even NN for Neural Network. These models are known to those skilled in the art and will not be detailed. The proximity of the real test data and of the learning data conditions the performance levels of these classification systems.

The major drawbacks to the supervised approach stem from the need to specify the abnormal events first, and to collect a sufficient and statistically representative quantity of these events. Specifying the events is not always possible, nor is collecting a sufficient number of productions to enrich a database. Also, a new supervised learning is necessary for each new configuration. The supervision task requires human intervention (manual or semi-automatic segmentation, labeling, etc.). The flexibility of these solutions is therefore limited in terms of usage, and the recognition of new environments is difficult to implement. Finally, learning event models takes account of the background noise and its variability, so, as a matter of fact, it may in certain cases not be robust. These approaches can be regarded as non-automated approaches, that is to say approaches that require human intervention.

Despite all the results that these systems give, the solutions from the prior art do not make it possible to correctly process the audio events that are not predefined. The robustness to the environment and its variability are limited.

SUMMARY

The idea behind the invention is based, notably, on a novel approach in which the method uses an automated learning step, that is to say a step that does not, in normal operation, require human intervention, since the various elements, sensors or other devices forming the system are sufficient in themselves to model an environment.

The invention relates to a method for detecting abnormal audio events in a given environment, characterized in that it comprises at least the following steps:

- an automated step for learning the modeling of said environment during which a database is created by the extraction of acoustic parameters associated with audio streams picked up over a fixed time period and an unsupervised automatic segmentation of said streams, followed by a step of grouping the segments into classes and a statistical modeling of the segment classes,
- a usage phase which comprises the analysis of an audio stream, with the extraction of the acoustic parameters, a step of automatic segmentation of said analyzed stream identical to that used during the learning phase and a step during which the likelihood of each statistical model contained in the database is determined on each of the segments of the analyzed audio stream,
- said step of determining likelihoods resulting in a likelihood value $\lambda$ which corresponds to the most probable model, the maximum of the likelihoods, which is compared to a threshold value in order to initiate or not a signal indicating the presence or absence of audio anomalies in the analyzed audio stream.

The modeling step is, for example, a statistical modeling of the segment classes which consists in modeling the probability density of all of the acoustic parameters of each segment class using a Gaussian mixture model or GMM.

According to another variant, the modeling step is a statistical modeling of the segment classes which consists in modeling the probability density of all the acoustic parameters of each segment class using a hidden Markov model or HMM.

The learning step involves, for example, using an algorithm which positions centroids uniformly distributed in the space of the parameters by executing the following steps:

1. calculation of the mean vector from all the learning data,
2. search for the segment most distant from the mean vector and initialization of the first centroid as being the mean vector of the segment found (nb_class=1),
3. iterations for incrementing the number of classes (nb_class=nb_class+1): the segment which maximizes the cumulative distance to the centroids identified in the preceding iteration is sought,
4. stop criterion: either when the predefined number of classes is reached, or when the distance between the segment found and the centroids identified in the preceding iteration is below a threshold.

The automatic segmentation step uses, for example, the dendrogram principle.

The automatic segmentation step can select a segmentation level by using one of the following criteria:

- applying a threshold Smax to the distance between the last two classes grouped together, that is to say minimizing the number of possible segments while minimizing the grouping distance concerned, and/or the maximum, over the segments of one and the same level, of the maximum over the vectors of one and the same segment (of the distance between the vector and the mean vector of the segment) and/or the maximum, over the segments of one and the same level, of the average over the vectors of one and the same segment (distance between the vector and the mean vector of the segment) and/or the minimum, over the segments of one and the same level, of the minimum over the vectors of one and the same segment (of the normalized inter-correlation coefficient between the vector and the mean vector of the segment) and/or the minimum, over the segments of one and the same level, of the average over the vectors of one and the same segment (of the normalized inter-correlation coefficient between the vector and the mean vector of the segment).

During the learning phase, said method uses, for example, a K-mean algorithm or an LBG-type algorithm for the step of grouping the segments into classes or a version derived from the K-mean algorithm.

The size of the model can be determined automatically by applying a threshold Smax to the distance between the last two classes grouped together, that is to say minimizing the number of possible segments while minimizing the grouping distance concerned.

The acoustic parameters used can be chosen from the following list: spectral, temporal or spectral-temporal parameters associated with the audio stream.

The invention also relates to a system for detecting audio anomalies in a given environment, characterized in that it comprises at least the following elements:

one or more audio sensors suitable for detecting audio streams, a preprocessing module suitable for executing an automatic segmentation of the acoustic parameters extracted from the audio stream to be analyzed, a module suitable for creating a database representative of the model of the environment to be surveilled, a module for calculating likelihood that takes as input the audio model of the database and the result of the likelihood calculation executed on an analyzed audio stream, a module for comparing the likelihood value obtained with a threshold value.

The system comprises, for example, a first preprocessing module and a first module for creating the database stored in a first processor for the system learning phase and a second preprocessing module and a second module for calculating likelihood, the module for calculating likelihood receiving as input information on the models obtained from the database.

The system comprises, for example, a central station or surveillance room equipped with a number of monitoring screens Ei, a module for redirecting video streams, a main screen Ep, several assemblies Zi each consisting of one or more audio sensors associated with video cameras Ci, Vi, said modules Ci, Vi being linked with a module suitable for determining a likelihood value $\lambda i$, said likelihood values $\lambda i$ being transmitted to the central station. The duly determined likelihood values can be used to arrange the associated video streams in order to assist an operator (automatic selection of the priority stream to the main screen, or manual selection by the operator based on the ordered display of the monitoring screens. The priority streams are, for example, those that have the lowest likelihood values).

BRIEF DESCRIPTION OF THE DRAWINGS

Other features and advantages of the present invention will become more apparent from reading about a nonlimiting exemplary embodiment, with reference to the figures which represent.

DETAILED DESCRIPTION

The following description will be given as a nonlimiting and illustrative example for surveillance and detection of abnormal audio events, such as cries, in a noisy sound environment, a metro platform for example. The audio detection system can also be used to hierarchically organize the video streams originating from a number of cameras. This usage mode may be particularly suitable for a surveillance application by providing help to the security operator responsible for directly viewing the various video streams.

Figure 1:
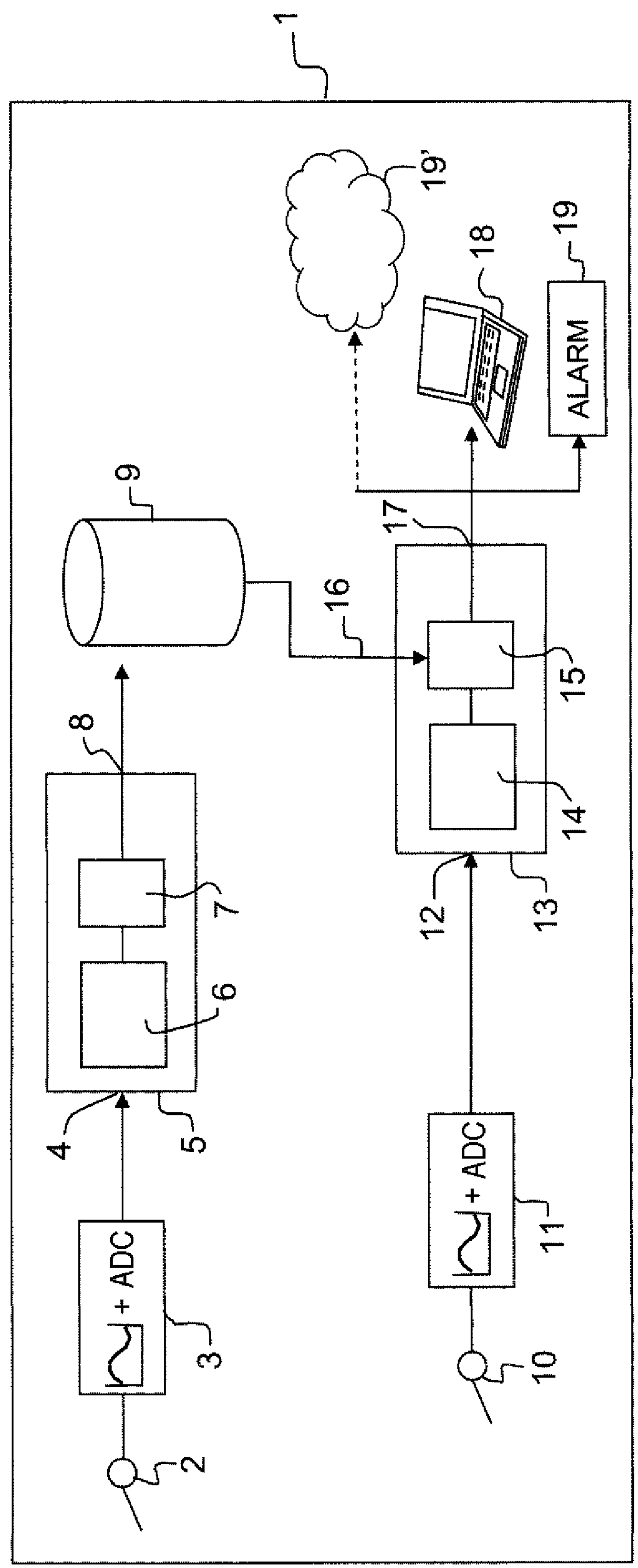
FIG. 1, an example of a detection system according to the invention.

In the example illustrated in FIG. 1, the detection system according to the invention will use two separate processors that have different computation capabilities. The top part of the figure shows the system used during the system learning period, whereas the bottom part shows an example of a system for picking up anomalies and recognizing these anomalies.

In certain usage cases, the system may comprise just one processor having sufficient computation and processing capabilities to execute the learning step and the recognition step.

FIG. 1 diagrammatically represents an example of the architecture of the system implemented by the invention, for which one portion relates to the learning of a database which will be used for the recognition of the noises and abnormal sound events on a metro platform. The system comprises an audio sensor 1 for sounds, for audio noises present in an area to be surveilled or for which an analysis of audible events is desired. The data received on this audio sensor 1 are transmitted, first of all, to a device 3 containing a filter and an analogue-digital converter known to those skilled in the art, then via an input 4 to a processor 5 comprising a module 6 detailed in FIG. 2 for preprocessing the data, a learning module 7. The duly generated models are transmitted via an output 8 of the processor 3 to a database 9. This database 9 will contain models corresponding to classes of acoustic parameters representative of an audio environment considered to be normal. This database will be initialized during a learning phase and may be updated while the detection system according to the invention is operating. The database 9 is also used in the noise recognition or detection of abnormal audio events.

The system also comprises, for the recognition of the abnormal audio events, one or more audio sensors 10, each sensor 10 being linked to a device 11 comprising a filter and an analogue-digital converter or ADC. The data detected by the audio sensor and formatted by the filter and the ADC are transmitted to a processor 13, via an input 12. The processor comprises a preprocessing module 14 detailed in FIG. 2, followed by a processed data recognition module 15, said module receiving information from the database 9 via a link 16 which may be wired or not. Once the information has been processed, the "abnormal audio event" or "abnormal audio events" result is transmitted via the output 17 of the processor either to a PC-type device, 18, for the result to be displayed, or to a device triggering an alarm 19, or even to a system 19' for redirecting the video stream and the alarm according, for example, to the scheme of FIG. 5.

The preprocessing modules 6 and 14 must be identical in order to ensure the compatibility of the models in the database 9. Also, the audio sensors 2 and 10 may be sensors that have similar or identical characteristics (type, characteristic and positioning within the environment) in order to avoid signal formatting differences between the learning and test phases.

The data can be transmitted between the various devices via wired links, or even using wireless systems, such as Bluetooth and other such systems, wireless local area networks (WLAN), etc.

An example of another system architecture will be given, as a nonlimiting illustrative example, in FIG. 5. This architecture is used notably to hierarchically organize different video streams obtained from different cameras or video devices associated with the surveillance sensors.

The system may also include a buffer memory, the function of which is notably to store the latest abnormal audio data or events. This buffer memory can thus enable a surveillance operator to access the streams stored upon the generation of an alarm. This memory is similar to the storage for video streams in video surveillance.

In the case of a system that implements a single processor, it is possible to envisage the use of one or more audio sensors, each associated with filters positioned before the processor.

Figure 2:
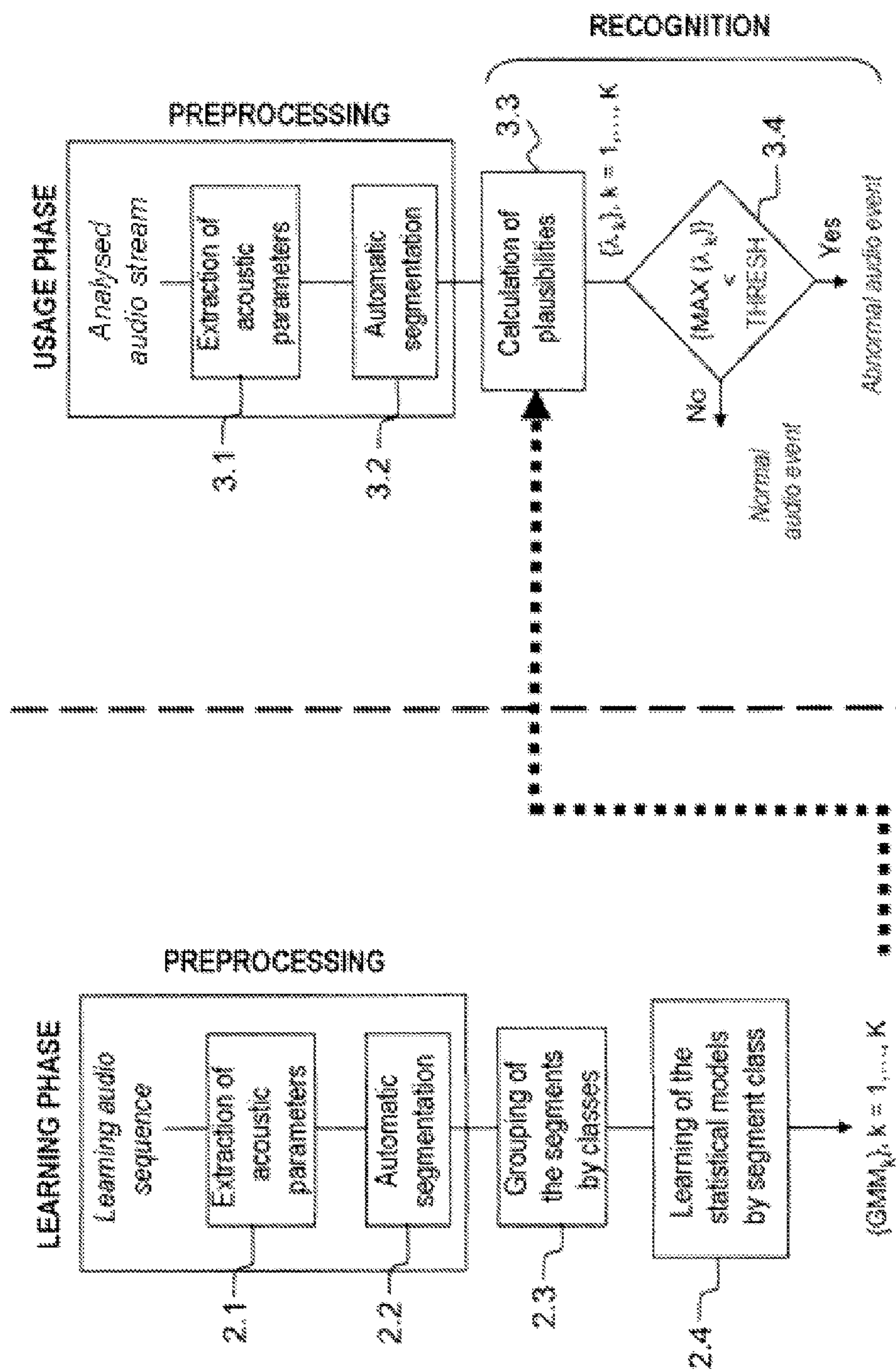
FIG. 2, the steps implemented during the learning phase and the system recognition phase according to the invention, FIG. 3, an example of class grouping, FIG. 4, an algorithm that can be implemented to construct a dictionary, FIG. 5, the profile of the distributions of scores of the abnormal audio events and of the normal audio events, FIG. 6, a detailed example of the steps during the usage phase of FIG. 2, and FIG. 7, another example of a system according to the invention.

FIG. 2 represents an example for the sequencing of the steps implemented during the method according to the invention, the left-hand part of the figure corresponding to the learning phase and the right-hand part to the usage phase.

A first step corresponds to the automated learning of the system. The system will use the sensor to record, during an initially set duration $T_A$, the noises and/or the audible background representative of the metro platform. This learning phase is automated and unsupervised. The acoustic parameters that will be used are generally spectral, temporal or spectro-temporal parameters. It is thus possible to use a modeling of the spectral envelope of the noise picked up by the microphone, such as the cepstral parameters or cepstral vectors. The audio stream, in this case, will be modeled by a sequence of cepstral vectors.

During the automated learning phase, an audio sequence representative of a sound environment in the initially targeted surveillance area is picked up. The acoustic parameters are extracted, during an extraction step 2.1, from the audio signal, from the audio sequence, by using a short-term sliding analysis window. Since this analysis technique is known to those skilled in the art, it will not be explained. One way of proceeding is to consider analysis frames with a duration, for example, of the order of 20 to 60 ms, with a typical overlap of 50%. The acoustic parameters considered by the method are chosen according to the properties of the signals to be modeled. The duration of an analysis frame usually takes account of stationarity assumptions concerning the signal analyzed over the period of the frame.

In the field of speech, the cepstral parameters that model the spectral envelope are often used in combination with other more specific parameters used to model temporal or spectral properties. Typical of these is the zero crossing rate (ZCR) in the time domain, or in the spectral domain the measurement known by the acronym SFM (spectral flatness measure). These two measurements form part of the parameters used to differentiate the spoken speech signals from noise signals. Numerous parameters are described in the literature that can be used to model one or more characteristics of the analysed signals (harmonicity, stationarity, spectral envelope, temporal envelope, frequency-localized energy, etc.).

The following step 2.2 is an automatic segmentation step based on the vectors of parameters extracted during the step 2.1. The aim of this segmentation step is to group together the vectors that are close together, for example, by using a predefined distance criterion. The criterion will be chosen according to the type of acoustic parameters that have been used to characterize the sound or audio background. This segmentation can be done in a number of ways, for example by using one of the techniques listed below: detection of breaks in trajectories or models, time breakdown, or dendrogram which corresponds to a graphical representation of a hierarchical classification tree revealing the progressive inclusion of the classes. In the case of the use of the dendrogram, over a period of several frames, which corresponds to a few seconds, the segmentation principle will consist in grouping together the frames in a so-called "bottom-up" approach by using an appropriate distance (suited to the parameters). The dendrogram supplies a set of possible segmentations (one segmentation for each level of the dendrogram). A number of criteria can be used to retain a segmentation for the rest of the processing: threshold on the distance between segments, or on an intra-segment correlation coefficient for example. The method then uses a buffer memory implemented within the system that must comprise at least one segment or group of vectors. Since such a buffer memory is conventionally used, it is not represented in the interests of simplicity.

The set of duly calculated segments will be used to construct a dictionary in which the number of classes Nc is predefined, or else determined automatically based on an interclass distance criterion for example. This corresponds to the steps 2.3 and 2.4.

Thus, during the step 2.3, the segments are grouped together by classes by implementing a K-mean type algorithm, or an LBG (Linde-Buzo-Gray) algorithm, or any other algorithm that has the same or similar functionalities, used by those skilled in the art.

With the segments grouped by classes (step 2.3), the next step (step 2.4) consists in modeling the probability density of all the acoustic parameters of each segment class by using, for example, a Gaussian mixture model, better known by the acronym GMM. The algorithm that is normally used to find the maximum likelihood of the parameters of the probabilistic model when said model depends on non-observable latent variables is better known by the abbreviation EM, which stands for expectation-maximization, and will be used for the system learning phase. The number of Gaussians used may be predefined or determined automatically from a criterion deriving from the "MDL" (minimum description length) information theorem in which the best hypothesis for a data set is that which leads to the widest data compression.

On completion of this step, the system therefore has a database 9 which corresponds to the learning of the system, i.e. one that comprises a sound model of the environment to be surveilled. This database comprises, for each determined class, the modeling of the distribution of the audio parameters used, which corresponds to the set {GMM$_k$}, k=1, . . . K, with K being the number of classes, when the Gaussian mixture model has been used.

One way of carrying out the unsupervised learning phase is detailed hereinbelow.

Dendrogram-Based Automatic Segmentation Approach

The learning corpus (all the signals representative of the sound environment to be modeled) is analysed. The analysis consists in extracting parameters from each frame with an overlap. Typically, the duration of the analysis frame is a few tens of ms, and the overlap is generally 50%. Depending on the type of environment, it may be preferable to use a shorter or longer frame in order to best take into account the degree of stationarity of the signals. Several types of analysis are possible (spectral, cepstral, temporal and other such analyses). The analysis of a frame results in a parameter vector, which is stored in a "first-in, first-out" type memory, better known by the acronym FIFO, this memory not being represented in the interests of clarity. The size of this memory (number of vectors stored) is equal to the number of elements (vectors in the present application case) used by the dendrogram. The corresponding duration (proportional to the size of the memory) may be of the order of a few hundred ms, even a few seconds for highly stationary background noises. This duration should generally be chosen so as to incorporate at the very least an audio event considered a priori to be elementary. However, a compromise may be applied in order to reduce the delay introduced by the processing during the system usage phase. Minimizing the number of vectors provides for a more reactive detection process result.

The dendrogram is in this case used to automatically obtain a segmentation of the audio signal. The principle consists in grouping together, in an abovementioned "bottom-up" approach, the elements at the input of the dendrogram. This method can be used to obtain a segmentation for all the different possible levels, in other words for a number of segments ranging from the initial number of elements to a single segment.

On initialization, each element is the representative of its class. If N is the number of elements (vectors) at the dendrogram input, there are then N classes at the lowest level.

Then, the number of segments is decremented in order to move to the higher level after grouping together the two classes that are closest together according to a distance criterion (defined according to the parameters used). There are several possible grouping types depending on the distance that is to be minimized for the selection of the classes to be grouped together. The four main grouping methods are:

minimum distance between the vectors of the classes, or "single linkage", maximum distance between the vectors of the classes, or "complete linkage", average distance between the vectors of the classes, or "average linkage", distance between the mean vectors (centroids), or "centroid linkage".

The stop criterion used is, for example, based on the minimum distance between the last two classes grouped together.

Figure 3:
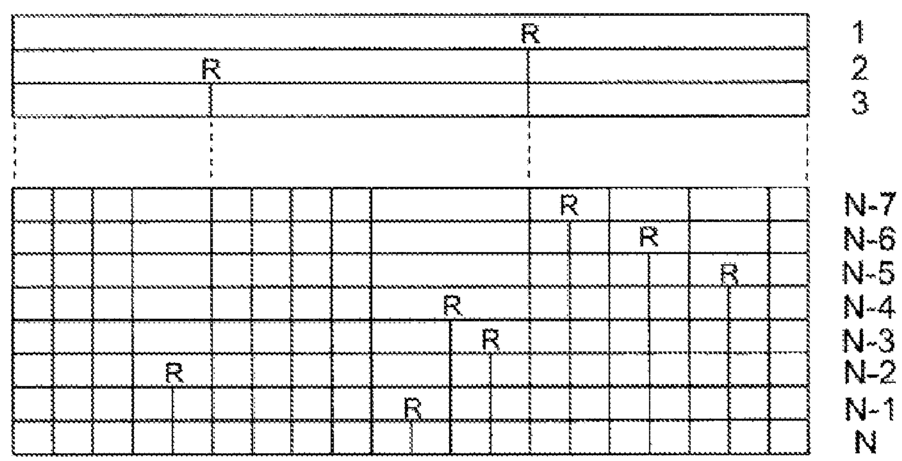

FIG. 3 shows an example of groupings according to the N classes for a bottom-up approach, the vertical axis corresponding to the vectors, the horizontal axis representing the buffer memory of the dendrogram. On completion of this grouping, the method provides 3, then 2, then one vector represented by a single letter R for the grouping.

The automatic segmentation method should finally, automatically, select a segmentation level that will be considered optimal according to a criterion to be defined.

A first criterion consists in applying a threshold Smax to the distance between the last two classes grouped together (the higher the level of the dendrogram, the greater the distance between the classes to be grouped together). The issue is therefore to minimize the number of possible segments while minimizing the grouping distance concerned.

Other criteria can be used, such as for example:

1. the maximum, over the segments of one and the same level, of the maximum over the vectors of one and the same segment (of the distance between the vector and the mean vector of the segment);
2. the maximum, over the segments of one and the same level, of the average over the vectors of one and the same segment (distance between the vector and the mean vector of the segment);
3. the minimum, over the segments of one and the same level, of the minimum over the vectors of one and the same segment (of the normalized inter-correlation coefficient between the vector and the mean vector of the segment);
4. the minimum, over the segments of one and the same level, of the average over the vectors of one and the same segment (of the normalized intercorrelation coefficient between the vector and the mean vector of the segment).

The alternative notations that can be used are, for example:

$$1.\ \underset{k=1,\ \ldots\ ,N-j}{\text{MAX}}\left\{\underset{x\in Segment\ k}{\text{MAX}}\{\text{distance}(x,\ c_k)\}\right\}$$

$$2.\ \underset{k=1,\ \ldots\ ,N-j}{\text{MAX}}\left\{\underset{x\in Segment\ k}{\text{AVERAGE}}\{\text{distance}(x,\ c_k)\}\right\}$$

$$3.\ \underset{k=1,\ \ldots\ ,N-j}{\text{MIN}}\left\{\underset{x\in Segment\ k}{\text{MIN}}\{\text{correlation}(x,\ c_k)\}\right\}$$

$$4.\ \underset{k=1,\ \ldots\ ,N-j}{\text{MIN}}\left\{\underset{x\in Segment\ k}{\text{AVERAGE}}\{\text{correlation}(x,\ c_k)\}\right\}$$

in which j=level index=0, . . . , N−1 (level 0:N classes, level N−1:1 class)

in which k=segment index (class) for the level j=1, . . . , N−j in which x is a vector of the segment (class) of index k in which $c_k$ is the mean vector (centroid) of the segment (class) k In the cases 1) and 2), the distance criterion should be less than a threshold while minimizing the number of segments. In the cases 3) and 4), the correlation criterion should be greater than a threshold while minimizing the number of segments.

Construction of a Dictionary by Grouping Similar Segments

The segmentation described previously is applied to all the learning base. The duly obtained segments are grouped together by class by using, for example, a learning algorithm of the LBG (Line-Buzo-Gray) type or a K-mean type algorithm. These algorithms can be used to associate each segment with a class, which is in turn represented by a mean vector (centroid). A simple distance criterion between a segment and the centroid consists in calculating the aggregate distance of the centroid to each of the vectors of the segment concerned. This can be expressed as follows:

$$\text{distance}(S,\ c_k) = \sum_{n=1}^{Nvectors} \text{distance}(x_n,\ c_k) = \text{distance between the segment } S \text{ and the centroid of index } k$$

in which $x_n$ is a vector of the segment S, n=1, . . . , N vectors.

The number of classes can either be fixed beforehand, or determined automatically by using a stop criterion based on the minimum distance between centroids (there is no need to increase the number of centroids if said centroids are sufficiently close according to a certain criterion). The determination of the threshold used for this stop criterion can be based on a spectral distance (possibly calculated on a non-linear scale of the frequencies of MEL or Bark type to introduce a constraint associated with the perception of the sounds). This spectral distance can generally be calculated from the parameters used by calculating the associated spectral envelopes. An alternative consists in determining the threshold from the correlation between the distances used with the parameters and the spectral distances.

Figure 4:
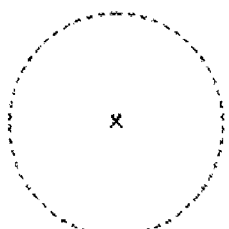
Figure 4:
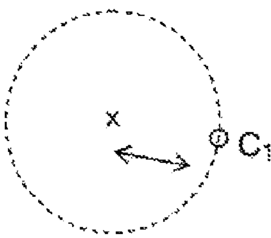
Figure 4:
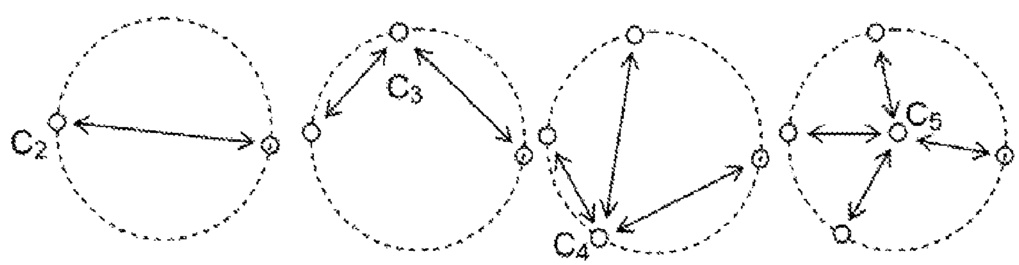

In as much as certain normal events may be under-represented, a modified learning version consists in using an algorithm that makes it possible to position the centroids uniformly distributed in the space of the parameters. An example of such an algorithm is represented in FIG. 4:

1) Calculation of the mean vector from all the learning data.
2) Search for the segment that is most distant from the mean vector and initialization of the first centroid as the mean vector of the segment found (nb_class=1).
3) Iterations for incrementing the number of classes (nb_class=nb_class+1): the segment that maximizes the aggregate distance to the centroids identified in the preceding iteration is sought.
4) Stop criterion: either when the predefined number of classes is reached, or when the distance between the segment found and the centroids identified in the preceding iteration is less than a threshold. The threshold may be linked to a spectrally-weighted perceptual distance.

GMM Learning

The EM (expectation-maximization) algorithm is used to construct a GMM model for each segment class. A criterion of minimum description length (MDL) type can be used to determine the optimum number of Gaussians per model, or else a default number of Gaussians is predefined.

Figure 5:
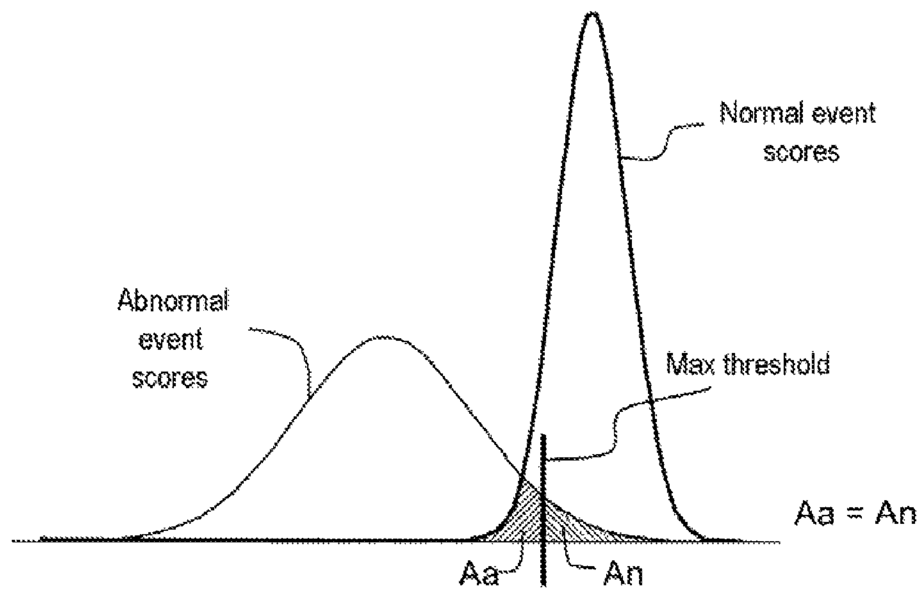

FIG. 5 represents an example of threshold positioned in the graph of the distribution profiles of the scores of the normal audio events and of the abnormal audio events. The threshold is used to provide a compromise between the number of false alarms and the number of false rejections. If the shaded areas (see figure), annotated Aa and An, are equal, the probability of false alarms is equal to the probability of false rejections.

Figure 6:
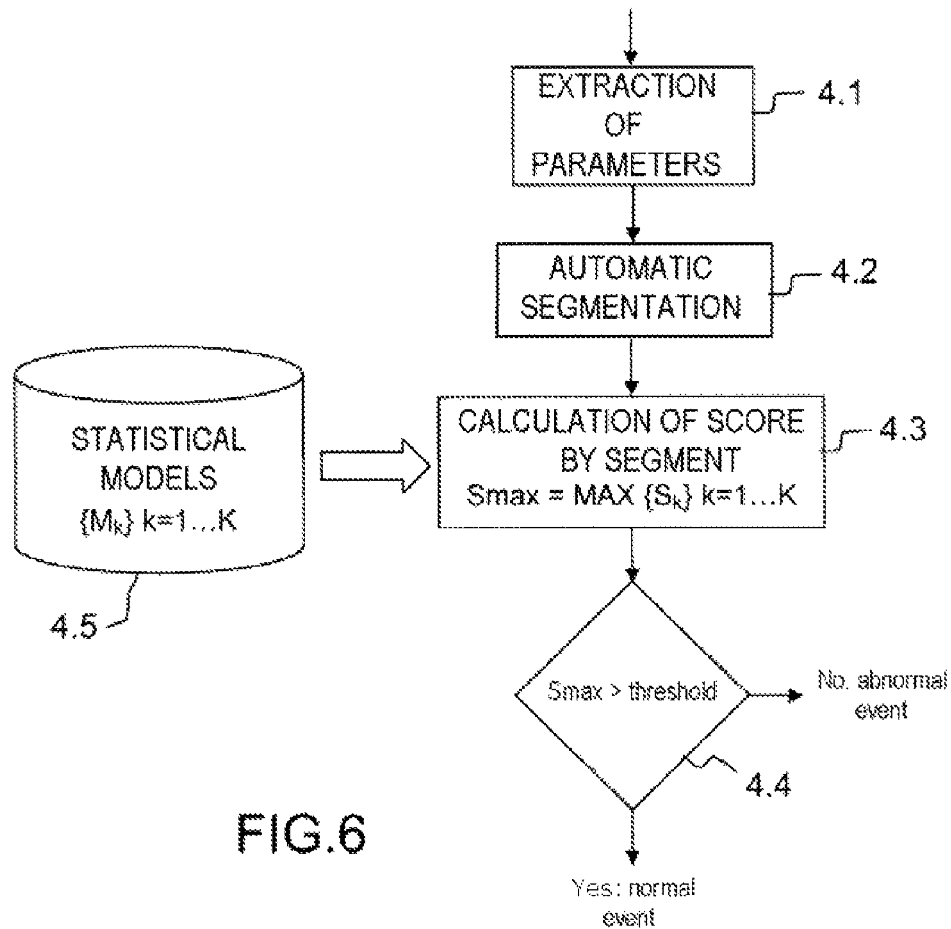

Principle of the Detection System (FIG. 6)

The segmentation module is, preferentially, identical to that implemented for the learning phase. On each segment detected 4.2, the logarithmic likelihood, or "log-likelihood", of each GMM model is calculated 4.3. A threshold 4.4 is then applied to the maximum log-likelihood obtained (the most probable GMM model) to decide on the presence or absence of an abnormal event. The system's detection threshold can be determined automatically from a predefined base 4.5 of abnormal events which makes it possible to estimate the distribution of abnormal event scores and compare it to the distribution of the scores obtained on the learning data. The threshold can then be chosen to have an operating point of the system prioritizing either the rate of false alarms or the rate of false rejections. In a practical manner, the distributions of the normal events and of the abnormal events are obtained from learning sequences, and from simulated sequences respectively. The simulated sequences are obtained by superimposing the abnormal events on the learning sequences with different signal-to-noise (SNR) ratios. In this case, the noise is the sound environment represented by the learning sequences, and the signal is the abnormal event. The optimum threshold can then be determined according to the desired compromise from the duly obtained distributions.

Models other than GMMs can be used, such as HMMs (hidden Markov models).

The Markov-type models, or HMMs, can be used to take into account the time trend of the sound event over the period of one segment. The learning algorithms are known, notably in the voice recognition field. Automatic segmentation can be used to initialize the learning of the HMM models, said models being used thereafter for the on-line segmentation using a Viterbi algorithm. A standard HMM topology can be used: Bakis model (left-right model). However, it is possible to retain the automatic segmentation and restrict the upstream segmentation.

With the system now having a database representative of the medium in which operating audio anomalies are to be detected, the description will now detail the steps implemented in normal operation of the system for detecting audio anomalies.

The system can run continuously, which means that it continuously picks up the sounds or audio streams present in the area to be monitored, or else an operator can control the operation of the system over time periods previously set by an operator.

The right-hand part of FIG. 2 represents the steps for the usage phase. Thus, the first step 3.1 will be to extract the acoustic parameters from the analysed audio stream.

The method described for the step 2.1 of the learning phase remains valid. The same segmentation method 3.1 is applied to the sequence of acoustic parameters from the analysed audio stream. The same applies for the segmentation step 3.2 which is executed in the same way as the step 2.2.

In the next step 3.3, the system has segments (characteristics of the audio stream being analysed). It then applies a likelihood step, that is to say that the likelihood of each GMM statistical model obtained during learning is calculated on each of the segments obtained during the step 2.2. It is possible to apply procedures for normalizing the likelihoods before taking the decision to detect or not detect an audio anomaly. Calculation of the likelihoods is applied for each class K and a score or likelihood $\lambda_k$ is assigned to a segment. This value is compared to a previously set threshold value. An abnormal event assumption is generated if none of the GMM models produces a score above a threshold. This nondetection (of normal event) threshold can be determined automatically from the learning data. The detection of a normal event can be taken over the period of the segment concerned or over the period of a number of consecutive segments.

The acoustic parameters used for the segmentation may be different from those used for the modeling. It is in fact fairly relevant to perform the segmentation according to a spectral criterion (cepstral parameters) and to add, for the modeling, additional specific parameters to provide for a finer modeling.

The decision thresholds can be predefined from prior knowledge concerning the signals, or learned by simulating abnormal conditions.

Various types of classification modules can be used in parallel, to enhance performance through a merging stage.

Different types of parameters can be used for the detection and classification in order to maximize the system's capacity to differentiate between normal and abnormal events.

The unsupervised and supervised approaches can advantageously complement one another.

The system and the method described hereinabove may be combined with a conventional supervised classification solution by limiting the false alarms. The classification is then activated only when an abnormal event is detected. The detection is made by taking into account the sound environment and therefore with greater robustness.

In the context of surveillance applications requiring the deployment of a transmission network, it is possible, without departing from the framework of the invention, to envisage a distributed architecture with processing operations centralized on a server and processing operations remotely sited as close as possible to the audio sensor (the processing operations may be: reducing the transmission bit rate, local functionalities for reactivating additional sensors: image, video, etc.).

Figure 7:
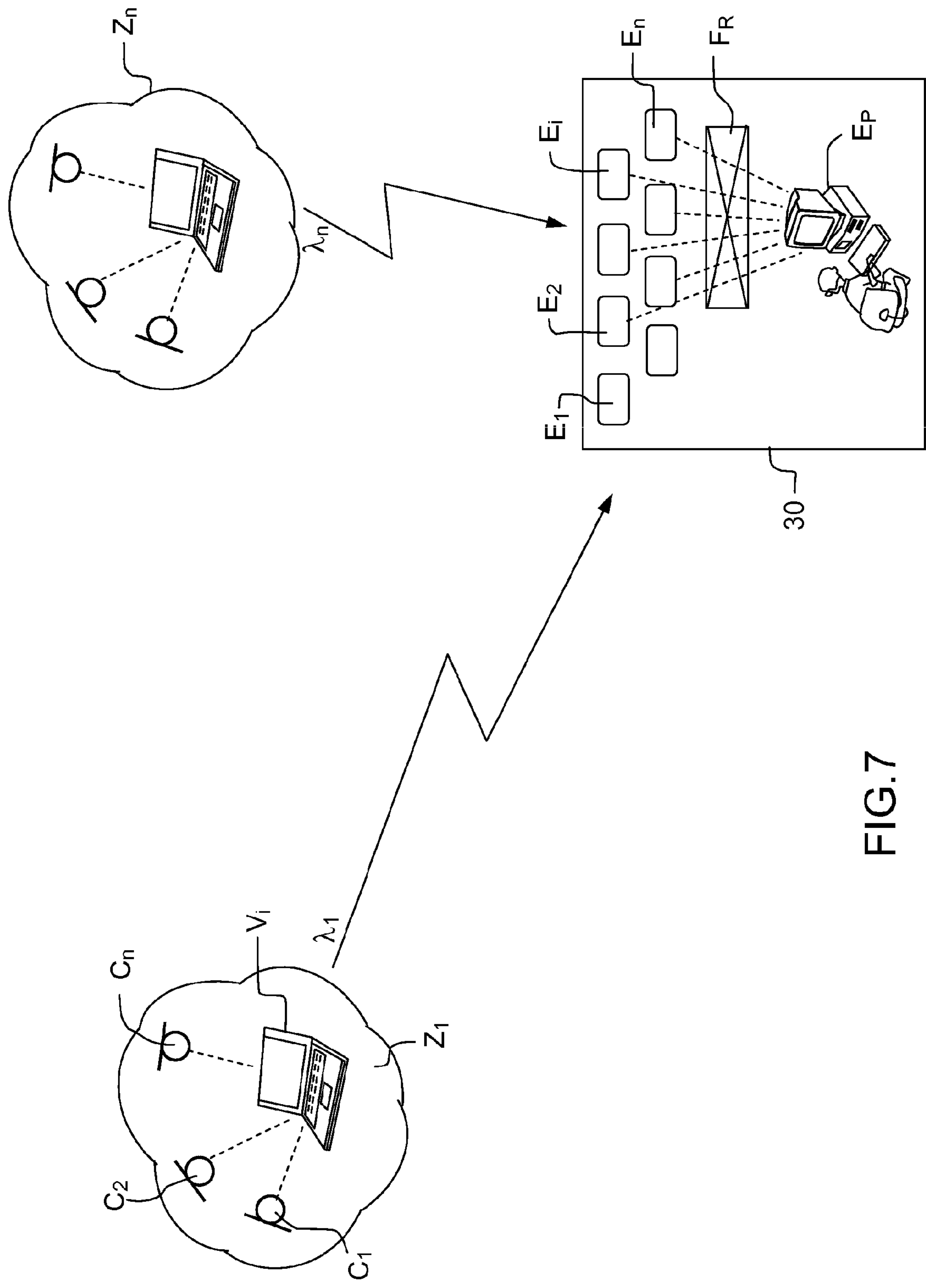

FIG. 7 diagrammatically represents an example of an architecture comprising a number of devices for recording sounds such as audio sensors Ci, notably abnormal audio events. The audio sensors are associated with a video camera Vi. The video camera and audio sensor assembly can possibly incorporate a preprocessing module. The duly formed assembly is linked, for example, to a computer Pi that includes a module for recognizing abnormal events, and a database 9 containing the models used to recognize the abnormal events. Each computer Pi is linked to a central facility or surveillance room comprising, for example, a number of surveillance screens Ei. The central facility receives the audio and video streams. It comprises a module Fr for hierarchically organizing the video streams obtained from the cameras according to their importance.

The links used to transfer data from one device to another are, for example, wired links or wireless links, of Bluetooth type, or else the system may be part of a wireless local area network, or WLAN.

Calculation of the likelihoods can be used to arrange the associated video streams in order to provide help to the operator (to produce an automatic selection of the priority stream to the main screen, or to facilitate a manual selection by the operator based on the ordered display of the monitoring screens. The priority streams are those that have the lowest likelihoods (the highest probability of having an abnormal audio event)).

The models obtained during the learning phase can be complemented with other models obtained during a subsequent learning phase. The system can then simply use the two sets of models as a reference of the normal sound environment, or use a set of models resulting from a more sophisticated grouping process. It is possible to synthesize new models by using a distance criterion between Gaussians (such as, for example, the Battacharyya distance, or the Kullback-Leibler divergence measurement). Another approach consists in applying the initial classification system to the new learning data, in not retaining, from the new data, those that obtain a score below a predefined threshold in order to learn new models. These new models are then added to the previous ones.

Since the inventive solution is not supervised, the system and the method notably offer the advantage of being able to be used in different environments without a priori any abnormal events to be detected. The system learning phase is automated from the automatic segmentation of the speech or audio picked up in the learning of the models used in the system. This automation also makes it possible to envisage an operating mode with regular or continuous updates.

Another advantage resulting from the automation of the processing subsystem is the possible reinitialization of the system with a new scenario or a new environment, and its capacity for change and adaptation over time.

The invention claimed is:

1. A method for detecting abnormal audio events in a given environment, the method comprising:

an automated step for learning a modeling of said environment during which a database is created by extraction of acoustic parameters associated with audio streams picked up over a fixed time period and an unsupervised automatic segmentation of said streams, followed by grouping segments into classes and a statistical modeling of the segment classes; and a usage phase which comprises analysis of an audio stream, with the extraction of the acoustic parameters, automatic segmentation of an analysed stream identical to that used during the learning phase and determining a likelihood of each statistical model contained in the database for each of the segments of the analysed audio stream, resulting in a likelihood value $\lambda$ which corresponds to a most probable model, the maximum of the likelihoods, which is compared to a threshold value in order to initiate or not a signal indicating a presence or absence of audio anomalies in the analysed audio stream, wherein the learning step involves using an algorithm which positions centroids uniformly distributed in a space of the parameters by executing the following steps:

1) calculation of a mean vector from all the learning data;

2) search for the segment most distant from the mean vector and initialization of the first centroid as being the mean vector of the segment found (nb_class=1); and 3) iterations for incrementing a number of classes (nb_class=nb_class+1): the segment which maximizes a cumulative distance to the centroids identified in the preceding iteration is sought, wherein a stop criterion is either when a predefined number of classes is reached, or when the distance between the segment found and the centroids identified in the preceding iteration is below a threshold.

2. The method according to claim 1, wherein the modeling step is a statistical modeling of the segment classes which consists in modeling the probability density of all of the acoustic parameters of each segment class using a Gaussian mixture model or GMM.

3. The method according to claim 1, wherein the modeling step is a statistical modeling of the segment classes which consists in modeling the probability density of all the acoustic parameters of each segment class using a hidden Markov model or HMM.

4. The method according to claim 1, wherein the automatic segmentation step uses a dendrogram principle.

5. A method for detecting abnormal audio events in a given environment, the method comprising:

an automated step for learning a modeling of said environment during which a database is created by extraction of acoustic parameters associated with audio streams picked up over a fixed time period and an unsupervised automatic segmentation of said streams, followed by grouping segments into classes and a statistical modeling of the segment classes; and a usage phase which comprises analysis of an audio stream, with the extraction of the acoustic parameters, automatic segmentation of an analysed stream identical to that used during the learning phase and determining a likelihood of each statistical model contained in the database for each of the segments of the analysed audio stream, resulting in a likelihood value $\lambda$ which corresponds to a most probable model, the maximum of the likelihoods, which is compared to a threshold value in order to initiate or not a signal indicating a presence or absence of audio anomalies in the analysed audio stream, wherein the automatic segmentation step uses a dendrogram principle, and wherein the automatic segmentation step selects a segmentation level by using one of the following criteria:

applying a threshold Smax to the distance between the last two classes grouped together, that is to say minimizing the number of possible segments while minimizing the grouping distance concerned; and/or the maximum, over the segments of one and the same level, of the maximum over the vectors of one and the same segment (of the distance between the vector and the mean vector of the segment); and/or the maximum, over the segments of one and the same level, of the average over the vectors of one and the same segment (distance between the vector and the mean vector of the segment); and/or the minimum, over the segments of one and the same level, of the minimum over the vectors of one and the same segment (of the normalized inter-correlation coefficient between the vector and the mean vector of the segment); and/or the minimum, over the segments of one and the same level, of the average over the vectors of one and the same segment (of the normalized inter-correlation coefficient between the vector and the mean vector of the segment).

6. The method according to claim 1, wherein during the learning phase, said method uses a K-mean algorithm or an LBG algorithm for the step of grouping the segments into classes or a version derived from the K-mean algorithm.

7. The method according to claim 6, wherein the size of the model is determined automatically by using a stop criterion based on the minimum distance between the last two classes grouped together.

8. The method according to claim 1, wherein the acoustic parameters used are chosen from the following list: spectral, temporal or spectral-temporal parameters associated with the audio stream.

9. A system for detecting audio anomalies in a given environment, the system comprising:

one or more audio sensors suitable for detecting audio streams;

at least one processor comprising a preprocessing module configured for executing an automatic segmentation of acoustic parameters extracted from the audio stream to be analysed;

a database created by a module representative of the model of the environment to be surveilled;

the at least one processor comprising a module for calculating a likelihood that takes as input the audio model of the database and the result of the likelihood calculation executed on an analysed audio stream; and the at least one processor comprising a module for comparing the likelihood value obtained with a threshold value, wherein the automatic segmentation uses a dendrogram principle, and wherein the automatic segmentation selects a segmentation level by using one of the following criteria:

applying a threshold Smax to the distance between the last two classes grouped together, that is to say minimizing the number of possible segments while minimizing the grouping distance concerned; and/or the maximum, over the segments of one and the same level, of the maximum over the vectors of one and the same segment (of the distance between the vector and the mean vector of the segment); and/or the maximum, over the segments of one and the same level, of the average over the vectors of one and the same segment (distance between the vector and the mean vector of the segment); and/or the minimum, over the segments of one and the same level, of the minimum over the vectors of one and the same segment (of the normalized inter-correlation coefficient between the vector and the mean vector of the segment); and/or the minimum, over the segments of one and the same level, of the average over the vectors of one and the same segment (of the normalized inter-correlation coefficient between the vector and the mean vector of the segment).

10. The system according to claim 9, further comprising:

a first preprocessing module and a first module for creating models stored in the database for the system learning phase; and a second preprocessing module and a second module for calculating the likelihood value, said second module receiving as input information on the models obtained from the database.

11. The system according to claim 9, further comprising:

a central station or surveillance room equipped with a number of monitoring screens Ei, a module for redirecting video streams;

a main screen Ep; and several assemblies Zi each comprising one or more audio sensors associated with video cameras Ci, Vi, wherein said modules (Ci, Vi) are linked with a module suitable for determining a likelihood value λi, and said likelihood value λi is transmitted to the central station.

12. The system according to claim 10, further comprising:

a central station or surveillance room equipped with a number of monitoring screens Ei, a module for redirecting video streams;

a main screen Ep; and several assemblies Zi each comprising one or more audio sensors associated with video cameras Ci, Vi, wherein said modules (Ci, Vi) are linked with a module suitable for determining a likelihood value λi, and said likelihood value λi is transmitted to the central station.

* * * * *